Aug. 14, 1945.　　　W. A. BEDFORD, JR　　　2,382,936
SPRING NUT MEMBER
Filed May 28, 1942　　　2 Sheets-Sheet 1

Inventor:
William A. Bedford, Jr.
by Walter P. Jones
Atty.

Aug. 14, 1945.  W. A. BEDFORD, JR  2,382,936
SPRING NUT MEMBER
Filed May 28, 1942  2 Sheets-Sheet 2

Inventor:
William A. Bedford Jr.
By Walter S. Jones
Att'y.

Patented Aug. 14, 1945

2,382,936

UNITED STATES PATENT OFFICE 2,382,936

SPRING NUT MEMBER

William A. Bedford, Jr., Boston, Mass., assignor to United-Carr Fastener Corporation, Cambridge, Mass., a corporation of Massachusetts Application May 28, 1942, Serial No. 444,802

4 Claims. (Cl. 85—36)

The present invention relates to spring nut members of the type adapted to be passed quickly over the threaded shank of a bolt or screw to approximate clamping position and drawn tightly together against one of the members to be clamped together by one or more turns of the screw. Such nut members are generally referred to as speed nuts and the invention aims to improve generally existing nuts of that type.

More specifically the invention aims to improve spring nut members of the type shown in the United States patent to Murphy, No. 2,259,-425, granted October 14, 1941, by providing a nut member having a stiffer screw-engaging portion engaging the screw threads throughout a greater extent than the nut disclosed in said patent.

Illustrative of the invention reference is had to the accompanying drawings, showing preferred forms of the invention and in which.

Figures 10, 11:
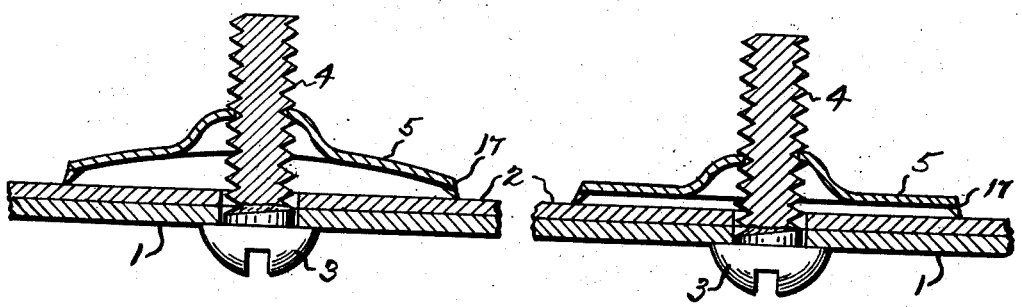

Figs. 6 to 9 inclusive are plan views of slightly modified forms of the invention;

Fig. 10 is an enlarged sectional view showing a nut member according to the invention at the limit of its pre-tightened position and immediately prior to the final tightening action; and Fig. 11 is a similar view thereof in full tightened and locked engagement.

Referring to the drawings, a preferred installation comprises a pair of superposed apertured plates or members 1 and 2 adapted to be clamped together between the head 3 of a bolt or screw and a nut 5 engaging the threaded shank 4 of the screw.

According to the invention, the nut member is formed of a suitably shaped blank of thin stiff springy material, such as steel or like metal, and is provided with a central screw-receiving opening normally of slightly less size and diameter than the major diameter of the screw shank. The blank is provided with a plurality of radial slots extending outwardly from the screw-receiving opening and with angular communicating slots extending rearwardly from the radial slot and close to the peripheral edge of the blank to form narrow flexible connections connecting the screw-engaging portions. The blank is thus highly flexible and readily bendable by pressure applied manually to the edge portions thereof, to permit the nut to be slipped over and along the screw to a position ready for final clamping, which is effected by rotation of the screw. During such rotation the thread-engaging portions assume a helical shape with the result that the sections are drawn into locking engagement with the threads of the screw.

The nut member 5 is preferably formed of thin spring steel or like sheet metal, provided with a central aperture 6 and radial slots 7 extending therefrom to a point adjacent to but short of the periphery of the blank to divide the blank into a plurality of relatively flexible sections 8. The outer ends of the radial slits 7 are joined to angularly extending slits 9, extending from the slits 7 in a direction opposite to the direction of rotation of the screw in clamping direction, and preferably near and substantially parallel to the adjacent peripheral edge of the blank 5 to provide readily flexible connecting means 10 between the several sections 8 of the blank. These connecting means or strips 10 should be sufficiently narrow to permit ready angular flexing of the sections 8 relative to each other as by manual pressure applied to the peripheral edges of the blank to permit the nut member to be readily slipped over and along the threaded shank 4 of the screw to an approximate clamping position.

Figure 5:
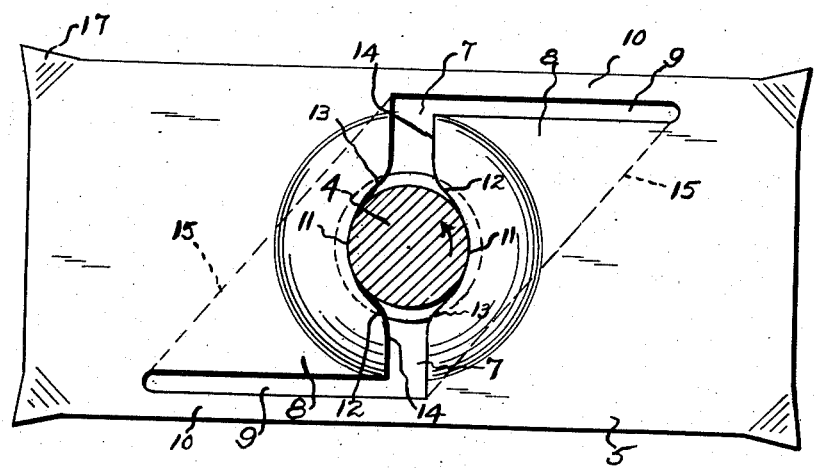
Fig. 5 is an enlarged plan view of the nut member, the screw being indicated in cross section.

The division of the blank into sections by the plurality of radial slots 7 provides a plurality of sections 8 each of which has an arcuate screw-engaging portion 11 of substantial length with an advanced thread-engaging portion 12 at the juncture with the radial slot 7 connected with slot 9 that extends rearwardly with reference to the direction of tightening rotation of the screw shank 4, as indicated by the arrow in Fig. 5, and a tail thread-engaging portion 13 at the juncture with the side of the slot 7 solidly joined with the section 8 rearwardly of the screw. The advanced thread-engaging portion 12 is thus formed on that portion of the section 8 near an apex 14 bounded on two sides by slots, whereas the tail thread-engaging portion 13 is adjacent a portion of the section 8 bounded on only one side by a slot.

It will thus be understood upon reference to Figs. 2, 5, 6, 7, 8 and 9 that as the nut member 5 is slipped axially over the screw shank to the approximate clamping position, the edge portion 11 will engage in the threads of the screw, as shown in Fig. 10. The screw may then be rotated one or more revolutions to clamp the members 1 and 2 securely, in which case the advanced thread-engaging portion 12 is raised outwardly beyond the tail thread-engaging portion 13, the body of the section 8 flexing along a diagonal line indicated at 15 (Fig. 5), permitting the thread-engaging portions to assume a position and shape as a part of a helix. The helical thread-engaging portions 11 thus engage and grip the threads of the screw throughout a substantial length, and as the arched blank is flattened toward the member 2 the screw-engaging portions 11 grip and interlock with the threads of the screw.

Advantageously, the portion of the blank surrounding the opening 6 is dished outwardly, as at 16, from the blank so that the thread-engaging portions will be spaced outwardly of the plane of the blank when the nut is in its fully tightened position. This aids materially in the clamping or locking action of the portions 11 in the thread of the screw.

The corners of the blank may be formed with inturned feet or prongs 17 adapted to grip more securely the member 2 and prevent rotation of the nut as the screw is tightened. These feet 17 also serve to support the extremities of the blank slightly spaced from the member 2 in the final locked portion so that the intermediate portion of the blank is flexed inwardly as the screw is tightened (see Fig. 11), thus increasing the clamping or locking action of the portions 11 on the screw threads.

Figure 1:
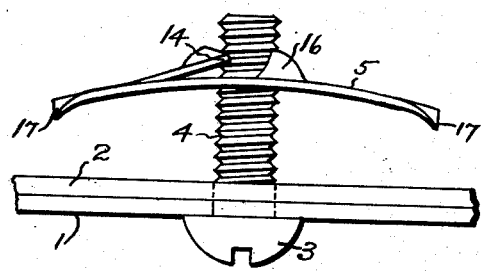
Fig. 1 is an enlarged side elevation of a form of the nut member used in combination with a screw for securing two parts together.
Figure 2:
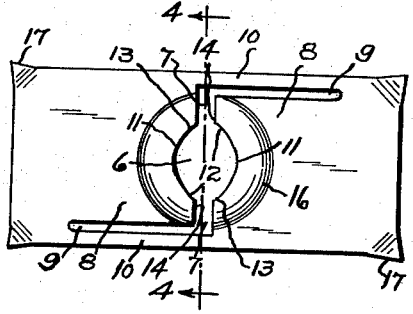
Fig. 2 is an enlarged top plan view of the nut member shown in Fig. 1.
Figure 3:
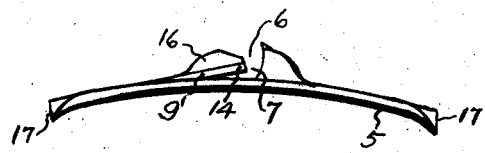
Fig. 3 is a side elevation of the nut member per se.
Figure 4:
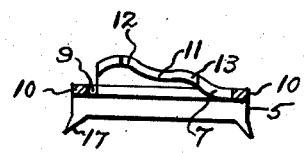
Fig. 4 is a transverse sectional view taken on the line 4—4 of Fig. 2.
Figure 6:
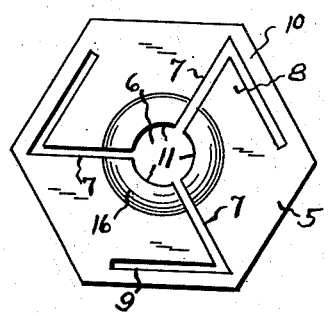
Figure 7:
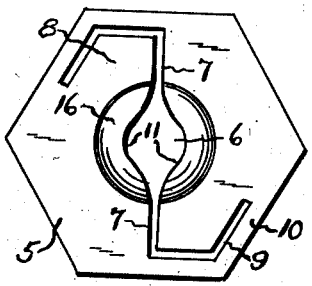
Figure 8:
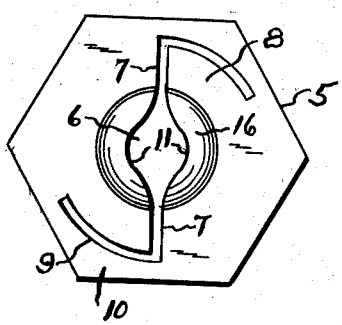
Figure 9:
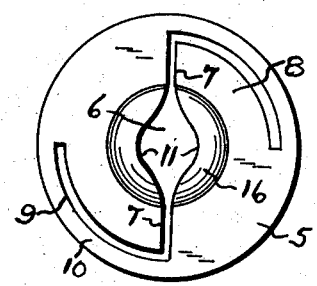

The blank may be of any shape desired, that is: it may be rectangular, as illustrated in Figs. 2 and 5, hexagonal, as illustrated in Figs. 6, 7, and 8, or circular, as illustrated in Fig. 9. Similarly, there may be any desired number of radial slots forming the section 8 around the opening 6, it being advantageous that the portions 11 be of substantial length so as to effectively grip in the threads of the screw.

Although I have illustrated and described the preferred embodiments of my invention, I do not wish to be limited thereby because the scope of my invention is best defined by the following claims.

I claim:

1. A spring speed nut member constructed for at least partial engagement with a threaded screw by relative axial movement comprising a blank of thin material formed with a screw-receiving opening, said blank being formed with at least two generally L-shaped communicating slots extending radially from said opening and then rearwardly thereof with reference to the direction of tightening rotation of the screw to provide a plurality of screw-engaging sections surrounding said opening, each of said sections being flexingly connected to said blank along a diagonal line substantially removed from the screw-receiving opening, so that one portion thereof may have greater resilience than another, whereby an intermediate screw-engaging edge may conform to the thread of a screw engaged therewith, and said sections being connected together by resilient connections permitting said blank to be flexed readily for effective enlargement of the screw-receiving opening to permit the nut member to be engaged over a screw by direct axial thrust.

2. A spring nut member for cooperation with a threaded screw comprising a blank of thin resilient material formed with a screw-receiving opening, said blank being formed with angularly communicating slots having portions extending radially from said opening and then other portions extending in different directions to provide a plurality of similar screw-engaging sections, said screw-engaging sections being flexible outwardly from the body of the blank along lines substantially spaced from said opening and angularly disposed with reference to said radial portions of the slots.

3. A spring nut member for cooperation with a threaded screw comprising a sheet metal body formed with a screw-receiving opening, said body being formed with opposed L-shaped slots connected to and communicating with said opening and presenting diametrically opposed portions extending radially from said opening and other portions extending angularly in opposite directions from the outer ends of the radially extending portions of the slots providing a plurality of similar screw-engaging sections on diametrically opposite sides of the opening, said screw-engaging sections being flexible outwardly from the nut body along lines substantially spaced from said opening and angularly disposed with reference to said radial portions of said slots.

4. A spring nut member for cooperation with a threaded screw comprising a blank of thin spring metal formed with a screw-receiving opening, said blank being formed with angularly shaped slots, portions of which extend radially from said opening and other portions of which are substantially parallel to an adjacent edge providing opposed screw-engaging sections and narrow readily flexible strips connecting said sections together, the adjacent sides of said sections including arcuate thread-engaging edges forming a part of said screw-receiving opening, said flexible connecting strips permitting said blank to be readily flexed by manual pressure applied to opposed edge portions of the blank to effect an enlargement of the screw-receiving opening and permit slipping of the blank along the screw, and said sections being bendable only along lines substantially spaced from the screw-receiving opening and diagonal to the radial slots upon tightening rotation of a screw to bend said screw-engaging edges to helical form.

WILLIAM A. BEDFORD, Jr.